(12) United States Patent
Wu

(10) Patent No.: US 9,490,860 B2
(45) Date of Patent: Nov. 8, 2016

(54) PROTECTIVE DEVICE CAPABLE OF DISSIPATING HEAT

(71) Applicant: ASIA VITAL COMPONENTS CO., LTD., New Taipei (TW)

(72) Inventor: Chun-Ming Wu, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 0 days.

(21) Appl. No.: 14/574,302

(22) Filed: Dec. 17, 2014

(65) Prior Publication Data
US 2016/0182113 A1    Jun. 23, 2016

(51) Int. Cl.
H04M 1/00       (2006.01)
H04B 1/3888     (2015.01)

(52) U.S. Cl.
CPC .................. H04B 1/3888 (2013.01)

(58) Field of Classification Search
CPC ............ H04M 1/026; H04M 1/0283; H04M 1/72575; F16M 11/041; F28D 15/02; F28D 15/0275; F28F 2013/006; F28F 21/02; F28F 21/06; F28F 2255/02
USPC ............................ 361/124, 274.3; 455/575.8
See application file for complete search history.

(56) References Cited

U.S. PATENT DOCUMENTS 6,324,055 B1 *  11/2001  Kawabe ............... G06F 1/1616
                                                361/679.54
2012/0314354 A1 *  12/2012  Rayner ............... G06F 1/1656
                                                361/679.01

* cited by examiner

Primary Examiner — Tu X Nguyen
(74) Attorney, Agent, or Firm — Jackson IPG PLLC; Demian K. Jackson

(57) ABSTRACT

A protective device capable of dissipating heat for protecting an electronic device includes a carrier and a flexible heat transfer unit. The carrier is used for correspondingly connecting to or receiving the electronic device therein and has a plurality of edges. The flexible heat transfer unit is arranged at one of the edges of the carrier and has a first and a second extended portion. The first extended portion is extended onto and connected to an inner side of the carrier, whereas the second extended portion is extended away from the carrier to connect to a flip cover. The first extended portion of the flexible heat transfer unit is in direct or indirect contact with a heat source of the electronic device, such that heat produced by the heat source can be transferred from the carrier to the flip cover via the flexible heat transfer unit.

13 Claims, 16 Drawing Sheets

PROTECTIVE DEVICE CAPABLE OF DISSIPATING HEAT

FIELD OF THE INVENTION

The present invention relates to a protective device, and more specifically, to a protective device that is capable of dissipating heat.

BACKGROUND OF THE INVENTION

Since the demand for portable devices has rapidly increased in recent years, smartphones and tablet PCs now far outnumber personal and notebook computers and quick improvement has also been made in smartphones. For example, being light and small and having largely improved performance, smartphones have higher and higher heating density, so that heat dissipation thereof has become an important issue. Generally, passive heat dissipation devices are widely used in most portable devices in view of the light weight and small volume thereof. Heat produced by electronic elements needs to be transferred to an outer side of a case of the portable device and dissipates into ambient air by way of natural convection and radiation. For the portable device, since the performance of the screen is very likely adversely affected by increased temperature, the heat produced by the electronic elements is normally transferred to a back case of the portable device via an internal heat transfer design without being transferred to the screen.

When the portable device operates, the temperature distribution on the back case of the portable device is uneven, and local hot spots tend to form at positions with electronic elements of high heating density, such as the central processing unit (CPU), the power amplifier (PA), the graphical display unit (GDU), or the battery, to result in rising temperature of the portable device. Apart from the problem of heat dissipation, the rising temperature of the portable device also tends to cause a burn of a user's skin that is in contact with the heated portable device for long hours.

Furthermore, during communication over the smartphone, the rising temperature of the smartphone also causes rising temperature and discomfort around the user's ear. Therefore, it is desirable to work out a way for effectively transferring the heat from the back case of the portable device to the ambient air, so as to prevent the heat from concentrating on the back case of the portable device, eliminate the forming of local hot spots on the back case, and lower the high temperature at local areas.

SUMMARY OF THE INVENTION

To solve the above problems, a primary object of the present invention is to provide a protective device capable of dissipating heat, so that heat produced by an electronic device and transferred to a carrier of the protective device can be further transferred via a flexible heat transfer unit to a position outside the carrier to dissipate into ambient air.

Another object of the present invention is to provide a flexible heat transfer unit connected to between a carrier and a flip cover, so that heat transferred to the carrier can be further transferred via the flexible heat transfer unit to the flip cover to dissipate into ambient air.

A further object of the present invention is to provide a protective device capable of dissipating heat, which forms an additional heat dissipation path outside an electronic device to prevent heat produced by the electronic device from concentrating on a back case of the electronic device.

A still further object of the present invention is to provide a protective device capable of dissipating heat, so as to prevent local hot spots from forming on the back case of an electronic device To achieve the above and other objects, the protective device according to the present invention for protecting an electronic device includes a carrier and a flexible heat transfer unit. The carrier is used for correspondingly connecting to or receiving the electronic device therein and has a first inner side oriented to the electronic device and a plurality of edges. The flexible heat transfer unit is arranged at one of the edges of the carrier and two opposite ends thereof respectively form a first and a second extended portion. The first extended portion is extended onto and connected to the first inner side, whereas the second extended portion is extended away from the carrier. The first extended portion of the flexible heat transfer unit is in direct or indirect contact with at least one heat source of the electronic device.

According to an embodiment of the protective device, the first extended portion has a first contact surface facing away from the first inner side of the carrier and oriented to the electronic device.

According to an embodiment of the protective device, the first contact surface of the first extended portion is in contact with the heat source of the electronic device.

According to an embodiment of the protective device, the carrier is provided with an on-carrier heat transfer element, which is in contact with the at least one heat source of the electronic device and has a first contact end in contact with the first contact surface of the first extended portion.

According to an embodiment of the protective device, the flexible heat transfer unit can be a graphite sheet or a metal foil-attached graphite sheet.

According to an embodiment of the protective device, the metal foil-attached graphite sheet includes at least one layer of metal foil attached to at least one layer of graphite sheet.

According to an embodiment of the protective device, the metal foil is made of gold, silver, copper, aluminum, or any combination thereof.

According to an embodiment of the protective device, the first contact surface is the metal foil.

According to an embodiment of the protective device, the flexible heat transfer unit is a flexible thin heat pipe.

According to an embodiment of the protective device, the second extended portion of the flexible heat transfer unit is extended to form a flip cover, which can be turned towards or away from the carrier.

According to an embodiment of the protective device, the flip cover can be a graphite sheet or a metal foil-attached graphite sheet.

According to an embodiment of the protective device, the second extended portion of the flexible heat transfer unit is connected to a flip cover, which can be turned towards or away from the carrier.

According to an embodiment of the protective device, the flip cover has a second inner side. The second extended portion of the flexible heat transfer unit is extended onto and connected to the second inner side of the flip cover. The second extended portion has a second contact surface facing away from the second inner side of the flip cover.

According to an embodiment of the protective device, the flip cover is provided with an on-cover heat transfer element, which has at least one contact end in contact with the second contact surface of the flexible heat transfer unit.

According to an embodiment of the protective device, the second contact surface of the flexible heat transfer unit is the metal foil.

According to an embodiment of the protective device, the carrier is a back base of the electronic device and is provided on the edges surrounding the first inner side with a plurality of clamping sections.

According to an embodiment of the protective device, the edges surrounding the first inner side of the carrier are respectively upwardly extended to form a protective wall, which has a free end inwardly bent to form a retaining edge, such that the first inner side, the protective walls and the retaining edges together define a receiving space to receive the electronic device therein.

The protective device according to another embodiment of the present invention for protecting an electronic device having a heat source includes a carrier having a first inner side for correspondingly connecting to or receiving the electronic device therein; a flip cover having a second inner side; a flexible heat transfer unit being connected to between the flip cover and the carrier, and having a first extended portion connected to the first inner side of the carrier and a second extended portion connected to the flip cover. The flip cover is supported by the flexible heat transfer unit to be turnable towards or away from the carrier; and the first extended portion of the flexible heat transfer unit is in direct or indirect contact with the heat source of the electronic device, such that heat produced by the heat source can be transferred from the carrier to the flip cover via the flexible heat transfer unit.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
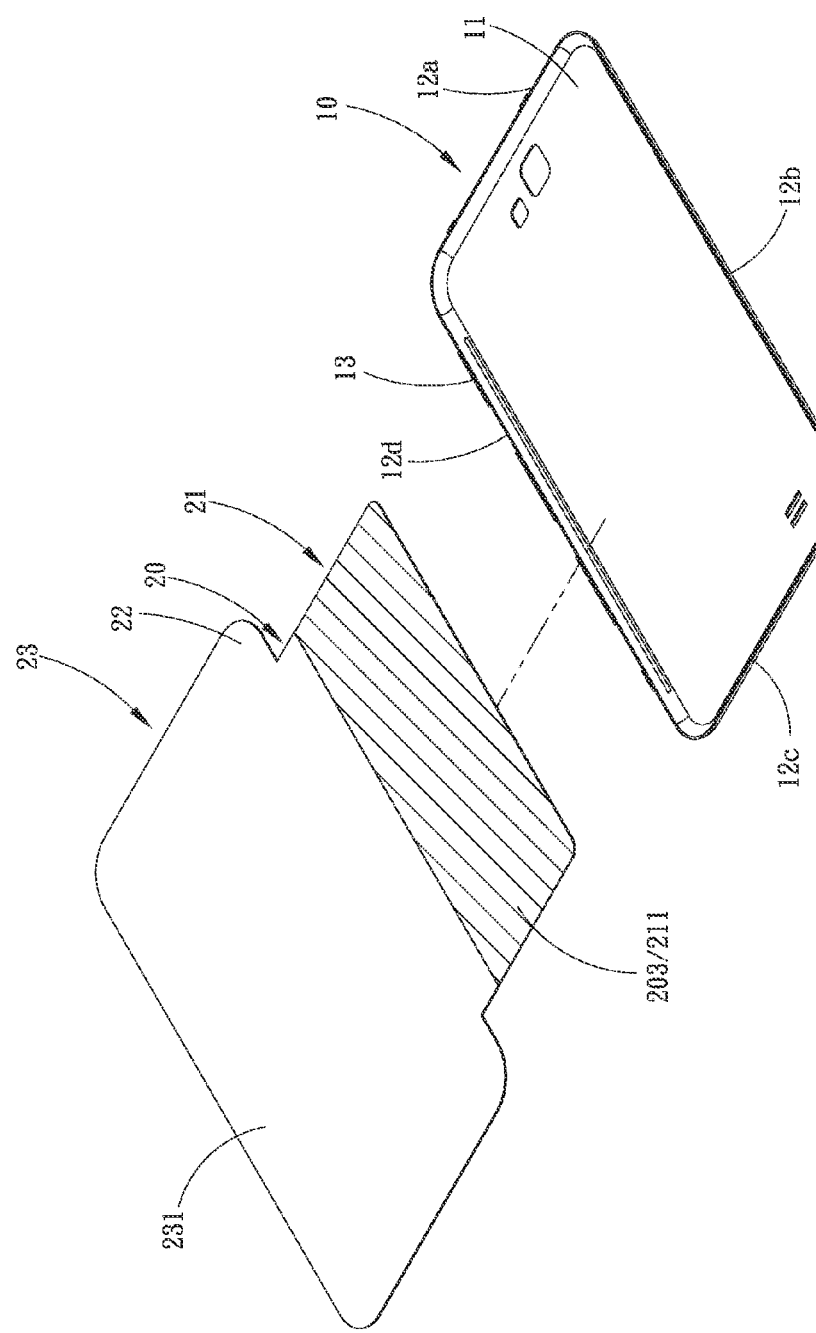
FIG. 1 is an exploded perspective view of a protective device capable of dissipating heat according to a first preferred embodiment of the present invention.

The present invention will now be described with some preferred embodiments thereof and by referring to the accompanying drawings. For the purpose of easy to understand, elements that are the same in the preferred embodiments are denoted by the same reference numerals.

Figure 2:
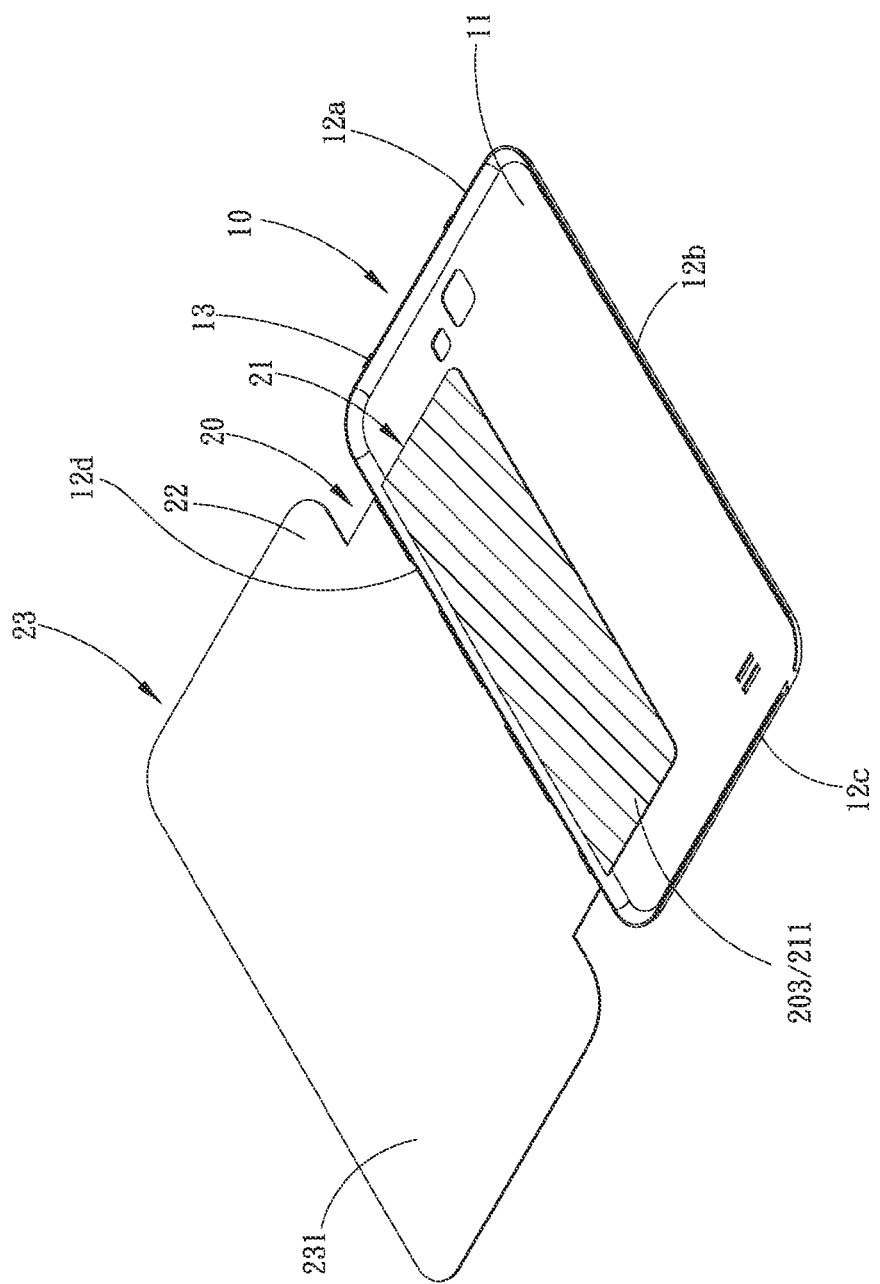
FIG. 2 is an assembled perspective view of FIG. 1.

Please refer to FIGS. 1 and 2, which are exploded and assembled perspective views, respectively, of a protective device capable of dissipating heat according to a first preferred embodiment of the present invention. For the purpose of conciseness, the present invention is also briefly referred to as the protective device herein. As shown, the protective device includes a carrier 10 and a flexible heat transfer unit 20. In the first preferred embodiment, the carrier 10 is a back case of an electronic device and has a first inner side 11 surrounded by four edges, namely, a first, a second, a third, and a fourth edge 12a, 12b, 12c and 12d, in which the second and the fourth edge 12b, 12d are located opposite to each other to define a width of the carrier 10. The first to the fourth edge 12a-12d are respectively provided with a plurality of clamping sections 13 for clamping to a front case of the electronic device. The flexible heat transfer unit 20 is arranged at the fourth edge 12d, and two opposite ends thereof are respectively formed into a first and a second extended portion 21, 22. The first extended portion 21 is extended onto the first inner side 11 and connected thereto by but not limited to ultrasonic welding. Alternatively, the first extended portion 21 and the first inner side 11 can be connected to each other when the carrier 10 is formed.

The first extended portion 21 has a first contact surface 211 facing away from the first inner side 11 of the carrier 10. The first extended portion 21 has an extended length determined according to the heat source positions in different electronic devices. For example, the first extended portion 21 can extend from the fourth edge 12d towards the second edge 12b by a length about one-third, two-thirds, or a half of the width of the carrier 10. The second extended portion 22 is extended away from the carrier 10 to form a flip cover 23, which has a second inner side 231 and can be turned towards or away from the carrier 10.

Figure 3A:
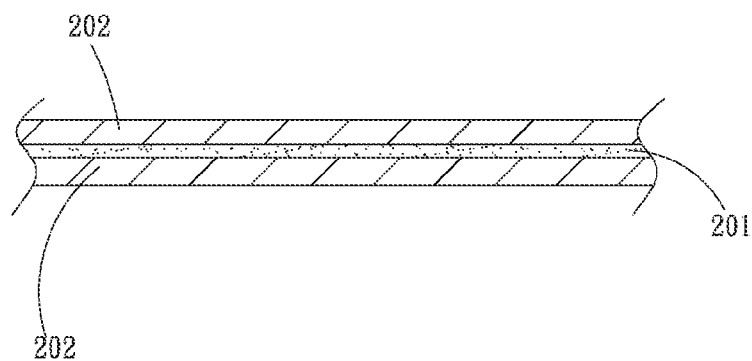
FIGS. 3A to 3E are fragmentary sectional views showing a first to a fifth configuration, respectively, of a flexible heat transfer unit and a flip cover included in the protective device of FIG. 1.
Figure 3B:
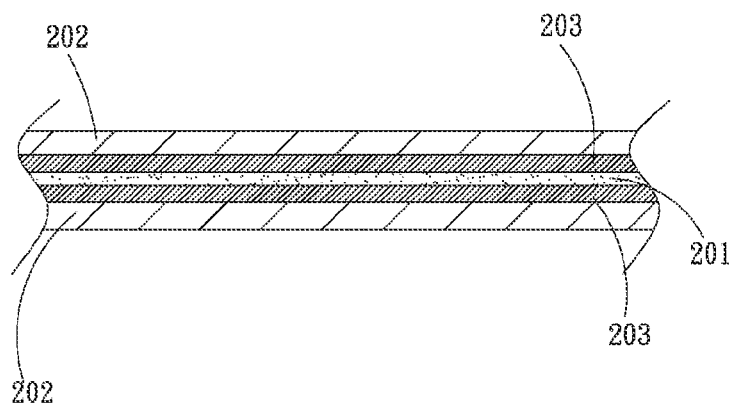
Figure 3C:
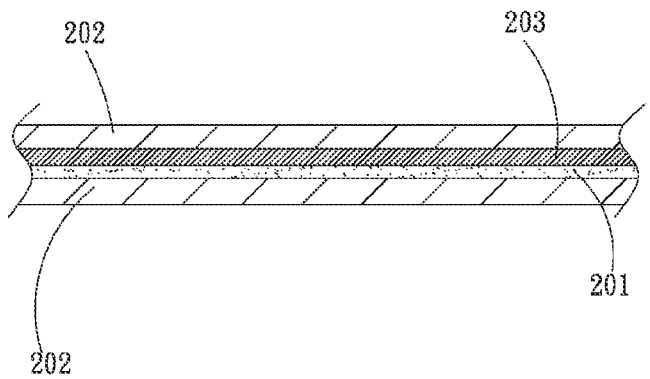
Figure 3D:
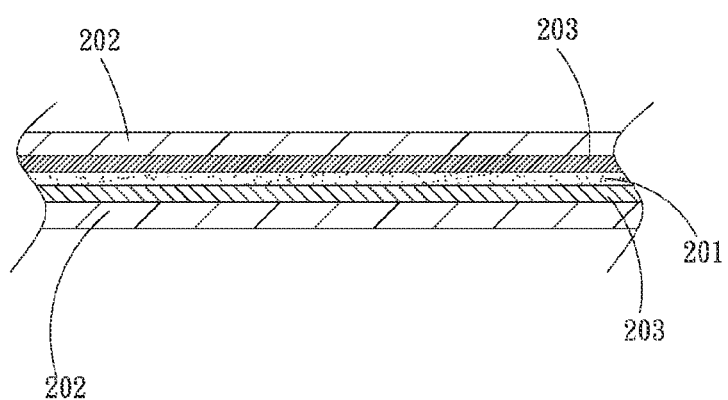
Figure 3E:
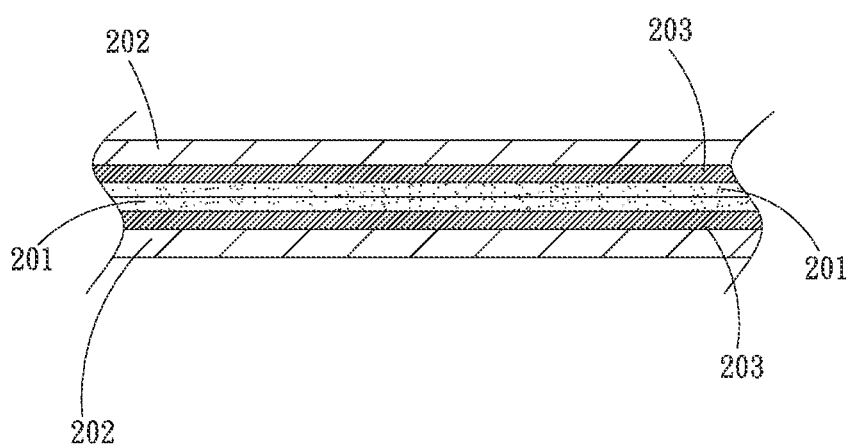

Please refer to FIG. 3A, which is a fragmentary sectional view showing a first configuration of the flexible heat transfer unit 20 and the flip cover 23. As shown, in the first configuration, the flexible heat transfer unit 20 and the flip cover 23 extended therefrom are made of a graphite sheet 201, and two opposite sides thereof are respectively coated with a protective layer 202. The protective layer 202 can be made of, for example, but not limited to, a natural or a synthetic leather, or a polymeric material, such as plastics, rubber, silica gel, or the like, for protecting the graphite sheet 201. The currently available graphite sheet comprise natural and artificial graphite sheet. The graphite sheet 201 is an artificial graphite sheet with a thermal conductivity as high as 1600 W/m·k, which is much higher than that of the natural graphite sheet (200 to 300 W/m·k), that of pure copper (298 W/m·k) and that of pure aluminum (238 W/m·k). In addition, the graphite sheet 201 has a material density about 1.9 g/cm, which is 25% lighter than aluminum and 75% lighter than copper in weight, and also has the advantages of being soft, bendable, low thermal resistance, and so on, such that the flexible heat transfer unit 20 has high thermal conductivity and is flexible.

Referring to FIGS. 3B to 3E, which are fragmentary sectional views showing a second to a fifth configuration, respectively, of the flexible heat transfer unit 20 and the flip cover 23. In these configurations, the flexible heat transfer unit 20 and the flip cover 23 extended therefrom are of a heat transfer sheet formed of at least one layer of metal foil 203 attached to at least one graphite sheet 201. The metal foil 203 can be made of gold, silver, copper, aluminum, or any combination thereof. For example, in the second configuration shown in FIG. 3B, there are two layers of metal foil 203, such as copper foil, attached to an upper and a lower side of one graphite sheet 201 and two protective layers 202 coated on outer sides of the two layers of metal foil 203. In the third configuration shown in FIG. 3C, there are one layer of metal foil 203, such as copper or aluminum foil, attached to an upper side of the graphite sheet 201 and two protective layers 202 coated on an outer side of the metal foil 203 and a lower side of the graphite sheet 201. In the fourth configuration shown in FIG. 3D, there are two layers of metal foil 203, such as a layer of copper foil and a layer of aluminum foil, attached to the upper and the lower side of one graphite sheet 201 and two protective layers 202 coated on outer sides of the two layers of metal foils 203. In the fifth configuration shown in FIG. 3E, there are plural of stacked graphite sheets 201, two layers of metal foil 203 attached to an upper and a lower side of the stacked graphite sheets 201, and two protective layers 202 coated on outer sides of the two layers of metal foil 203. With the high strength and high thermal conductivity of the metal foil 203 and the high thermal conductivity of the graphite sheet 201, the flexible heat transfer unit 20 is flexible and repeatedly bendable and provides high heat transfer effect.

Further, in another possible embodiment, the flexible heat transfer unit 20 is a flexible thin heat pipe, which is flexible and repeatedly bendable and provides high heat transfer effect.

Figure 4A:
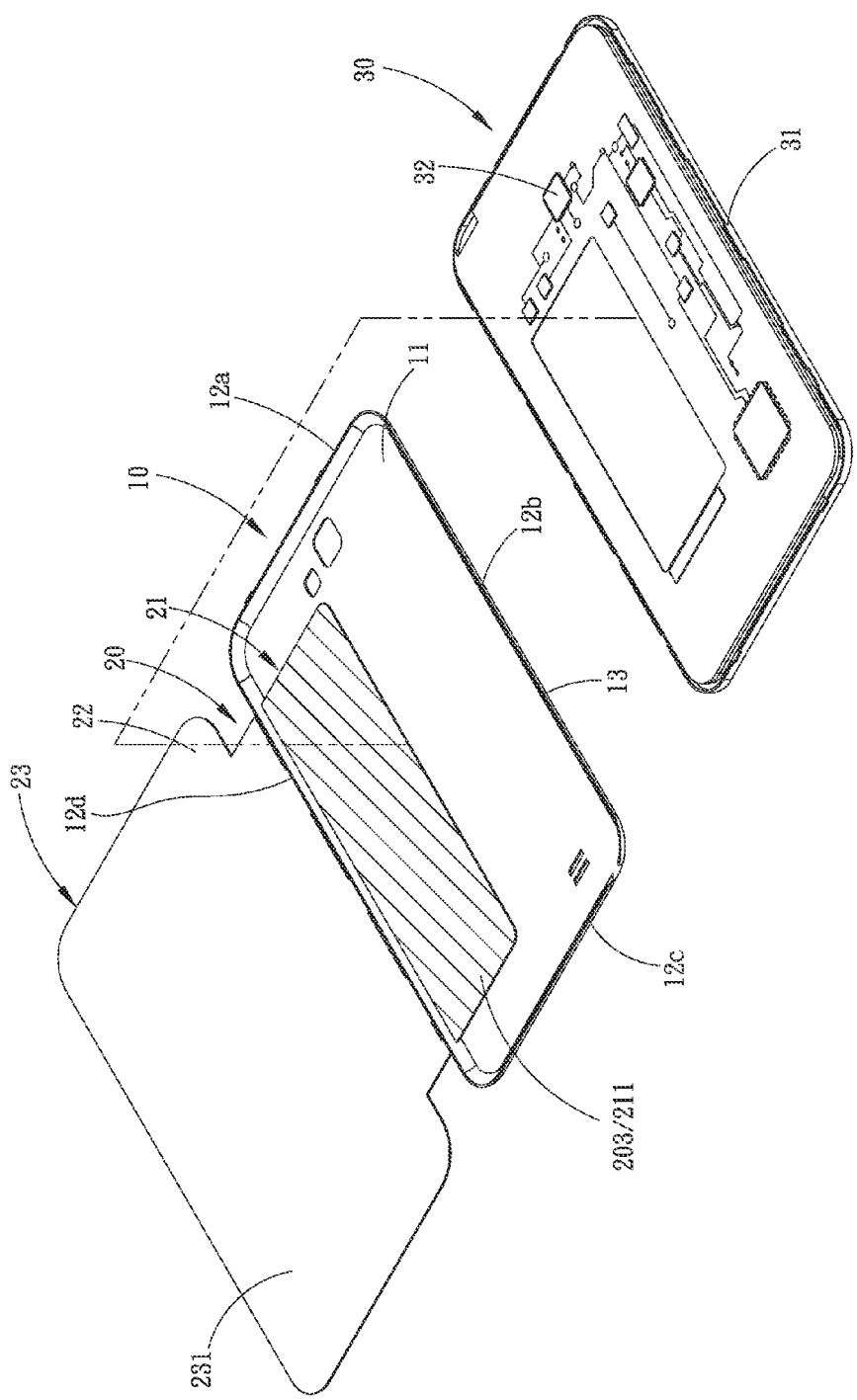
FIG. 4A shows the protective device of FIG. 1 before an electronic device is connected to a carrier thereof.
Figure 4B:
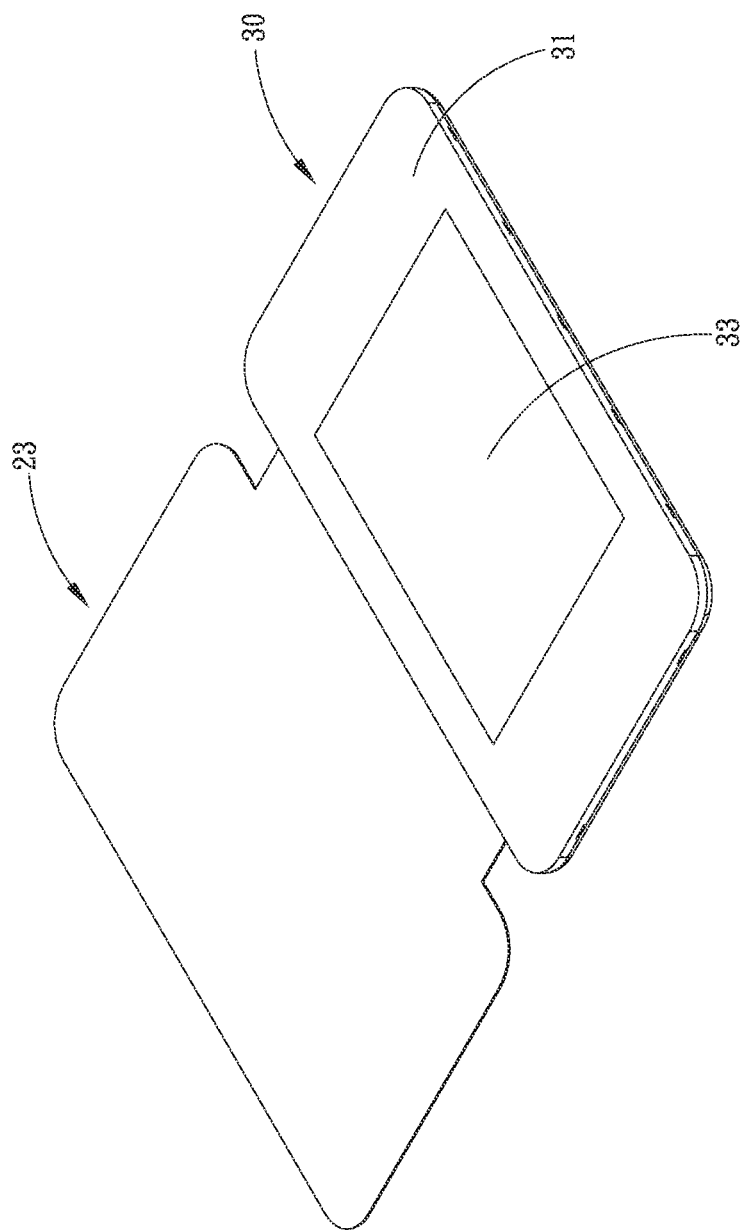
FIG. 4B shows the protective device of FIG. 4A after the electronic device is connected to the carrier thereof.

Please refer to FIGS. 4A and 4B along with FIGS. 1 and 2. The first contact surface 211 of the first extended portion 21 is preferably the metal foil 203. For this purpose, the protective layer 202 on the outmost sides of the flexible heat transfer unit 20 is not coated on the first contact surface 211 to expose the metal foil 203. An electronic device 30, such as a smart phone or a tablet computer, can be connected to the carrier 10. The electronic device 30 includes a front case 31 and a touch screen 33 mounted on the front case 31. The electronic device 30 has a back oriented to the first inner side 11 of the carrier 10, and a heat source 32, such as a circuit board and other electronic elements mounted thereon, mounted on the back thereof. In the illustrated first embodiment, the first extended portion 21 is extended onto the carrier 10 by a length to correspondingly cover the heat source 32, which is located at a position on the back of the electronic device 30 corresponding to the first contact surface 211 of the first extended portion 21. In FIG. 4A, the illustrated heat source 32 is located at a right side of the back of the electronic device.

When the carrier 10 is correspondingly connected to the electronic device 30, the clamping sections 13 on the first to fourth edges 12a-12d are clamped onto the front case 31 of the electronic device 30, such that the heat source 32 of the electronic device 31 is in direct contact with the first contact surface 211 of the first extended portion 21. After that, the flip cover 23 can be turned towards the carrier 10 to cover the front case 31 and the touch screen 33 of the electronic device 30 or be turned away from the carrier 10.

Figure 4C:
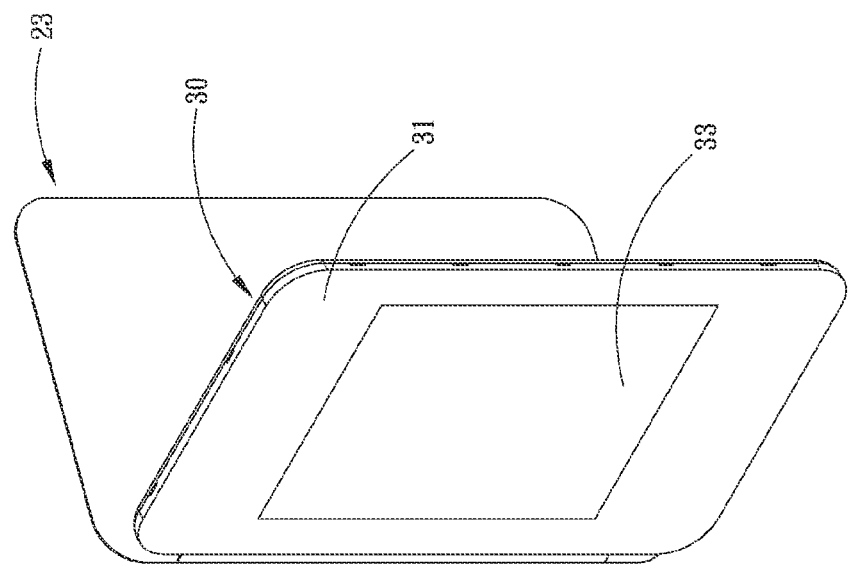
FIG. 4C shows the flip cover of the protective device of FIG. 4B is turned to a back side of the electrode device.

Referring to FIG. 4C, when the electronic device 30 is in use, such as being used to make a phone call, the flip cover 23 of the flexible heat transfer unit 20 can be turned to the back side of the electronic device 30, so that two sides of the flip cover 23 are exposed to the ambient air. Meanwhile, the heat source 32 of the electronic device 30 is in direct contact with the flexible heat transfer unit 20, such that heat produced by the heat source 32 can be transferred to the metal foil 203 and the graphite sheet 201 via the first contact surface 211 of the first extended portion 21 of the flexible heat transfer unit 20, and then to the flip cover 23 formed of the second extended portion 22 to finally dissipate into the ambient air through heat exchange. In this manner, the temperature of the carrier 10 is lowered and the heat produced by the heat source 32 would not concentrate on a local area of the carrier 10.

Figure 5A:
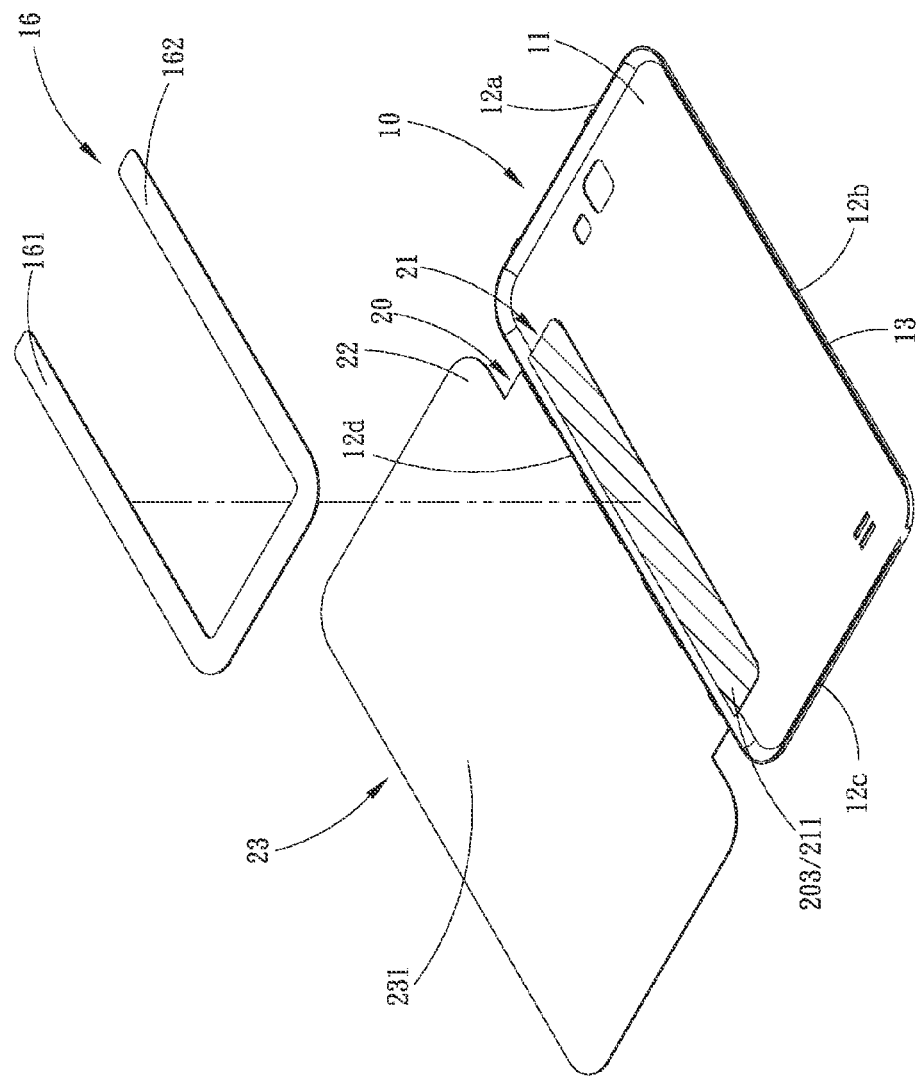
FIG. 5A is an exploded perspective view of the protective device capable of dissipating heat according to a second preferred embodiment of the present invention.
Figure 5B:
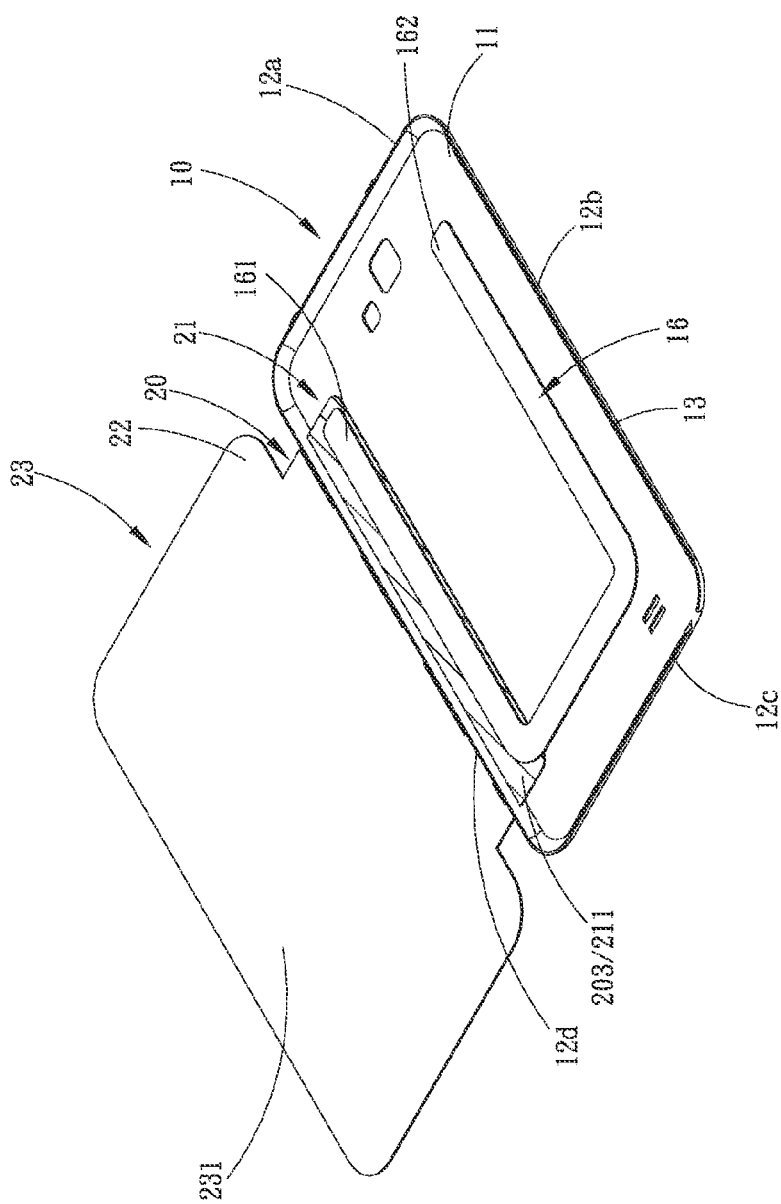
FIG. 5B is an assembled perspective view of FIG. 5A.

Please refer to FIGS. 5A and 5B, which are exploded and assembled perspective views, respectively, of the protective device according to a second preferred embodiment of the present invention. As shown, the second embodiment of the protective device is generally structurally similar to the first embodiment except that, in this second embodiment, the first extended portion 21 of the flexible heat transfer unit 20 is extended onto the carrier 10 by a length about one-third or one-fourth of the width of the carrier 10, and the carrier 10 is provided on the first inner side 11 with an on-carrier heat transfer element 16. The on-carrier heat transfer element 16 has a first and a second contact end 161, 162. The first contact end 161 is attached to the first contact surface 211 of the first extended portion 21 to contact with the metal foil 203 of the first contact surface 211, whereas the second contact end 162 is extended away from the first contact end 161. One of the first and the second contact end 161, 162 is in contact with the heat source 32 of the electronic device 30 illustrated in FIG. 4A, to transfer the heat produced by the heat source 32 to the other contact end.

In the illustrated second preferred embodiment, the second contact end 162 is in contact with the heat source 32 of the electronic device 30 illustrated in FIG. 4A, to transfer the heat produced by the heat source 32 to the first contact end 161. Thereafter, the heat is transferred to the first contact surface 211 of the first extended portion 21, and then to the flip covers 23 via the flexible heat transfer unit 20 to finally dissipate into ambient air. The first extended portion 21 is in indirect contact with the heat source 32 via the on-carrier heat transfer element 16 to transfer the heat produced by the heat source 32 to the flip cover 23 formed of the second extended portion 22 to dissipate the heat.

Figure 5C:
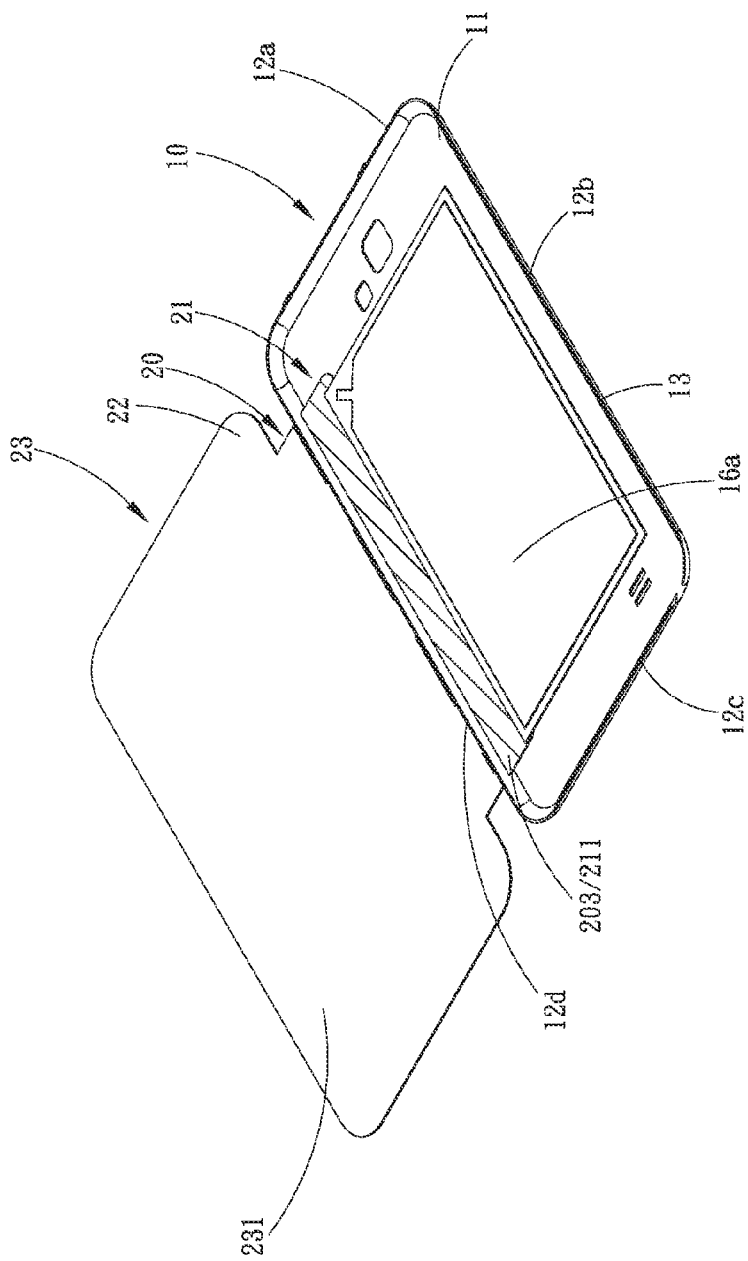
FIG. 5C shows another type of on-carrier heat transfer element for the protective device of FIG. 5A.
Figure 5D:
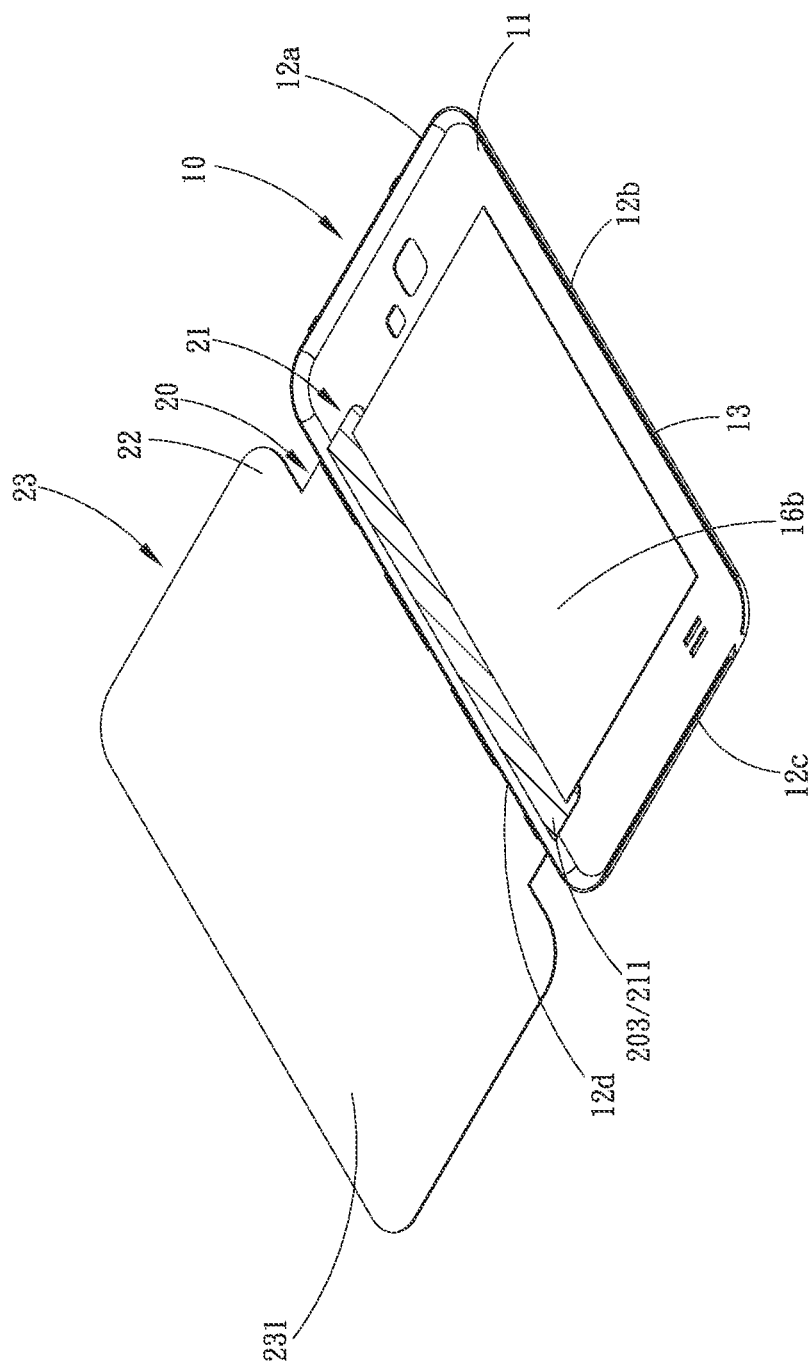
FIG. 5D shows a further type of on-carrier heat transfer element for the protective device of FIG. 5A.

The on-carrier heat transfer element 16 can be, for example, an ultra thin heat pipe as shown in FIGS. 5A and 5B, a vapor chamber 16a as shown in FIG. 5C, a metal foil/graphite sheet 16b combination as shown in FIG. 5D, or any combination thereof.

Figure 6:
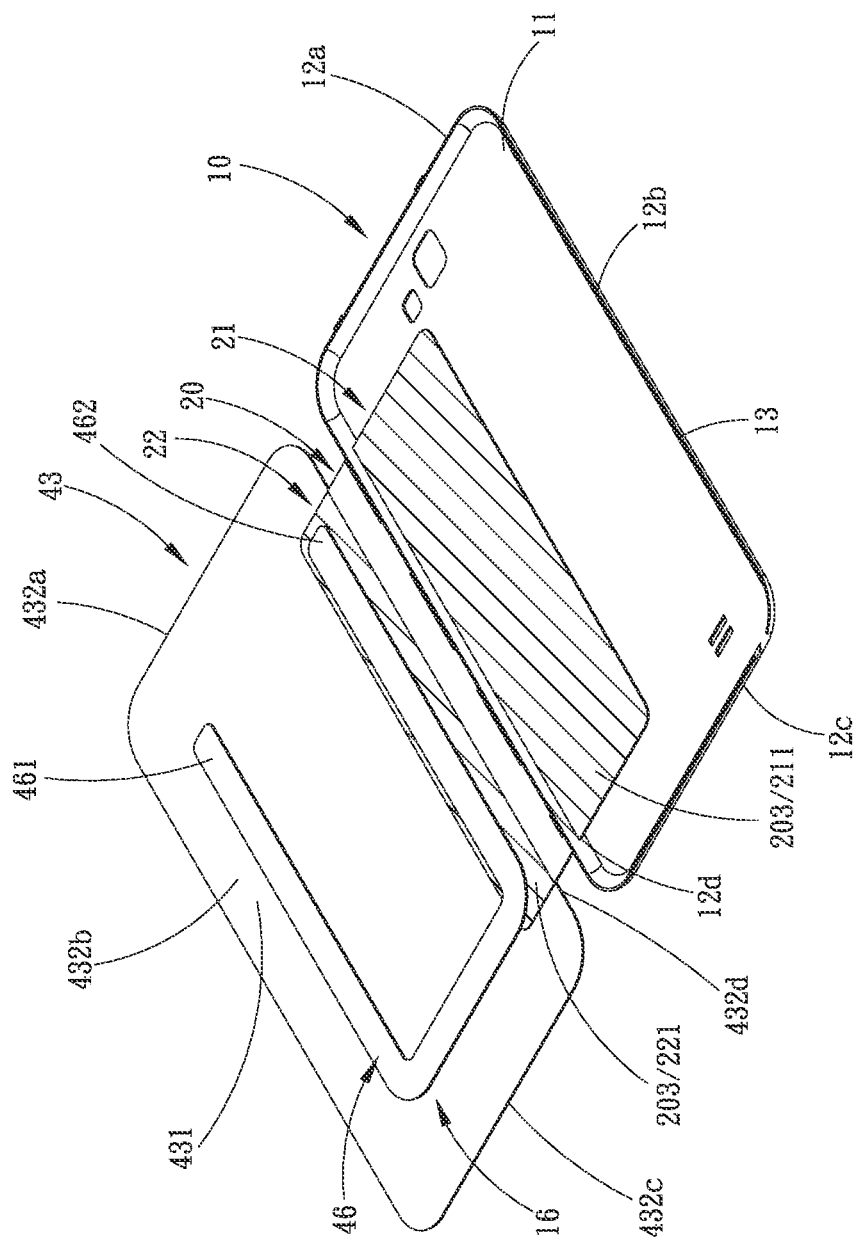
FIG. 6 is a perspective view of the protective device capable of dissipating heat according to a third preferred embodiment of the present invention.

Please refer to FIG. 6, which is a perspective view of the protective device according to a third preferred embodiment of the present invention. As shown, the third embodiment of the protective device is generally structurally similar to the first embodiment except that, in this third embodiment, the second extended portion 22 of the flexible heat transfer unit 20 is connected to a flip cover 43, which can be turned towards or away from the carrier 10. The flip cover 43 has a second inner side 431, and a first, a second, a third, and a fourth edge 432a, 432b, 432c and 432d, in which the second and the fourth edge 432b, 432d are located opposite to each other to define a width of the flip cover 43. The second extended portion 22 is extended from the fourth edge 432d to the second inner side 431 and connected thereto by but not limited to ultrasonic welding. The second extended portion 22 has a second contact surface 221 facing away from the second inner side 431 of the flip cover 43. In the illustrated third preferred embodiment, the second extended portion 22 is extended from the fourth edge 342d towards the second edge 432b by a length about one-fourth or one-fifth of the width of the flip cover 43 as shown in FIG. 6. In another possible embodiment, the second extended portion 22 can be extended to cover the second inner side 431 of the flip cover 43.

In another possible embodiment, the second contact surface 221 of the second extended portion 22 is preferably the metal foil 203, as shown in FIGS. 3B to 3E. For this purpose, the protective layer 202 on the outmost sides of the flexible heat transfer unit 20 is not coated on the second contact surface 221 to expose the metal foil 203. An on-cover heat transfer element 46 having a third and a fourth contact end 461, 462 is provided on the flip cover 43. One of the third and the fourth contact end 461, 462 is in contact with the metal foil 203 of the second contact surface 221 of the second extended portion 22 of the flexible heat transfer unit 20, and the other is extended away from the second extended portion 22. In the illustrated FIG. 6, the fourth contact end 462 of the on-carrier heat transfer element 46 is attached to the second contact surface 221 of the second extended portion 22 to contact with the metal foil 203 of the second contact surface 221, whereas the third contact end 461 is extended away from the second contact surface 221 towards the second edge 432b.

The heat produced by the heat source 32 of the electronic device 30 illustrated in FIG. 4A is transferred to the second contact surface 221 of the second extended portion 22 via the first contact surface 211 of the first extended portion 21 of the flexible heat transfer unit 20, then to the fourth contact end 462 of the on-cover heat transfer element 46, and finally to the third contact end 461, such that the heat can be transferred from the carrier 10 via the flexible heat transfer unit 20 to the flip cover 43 to dissipate into the ambient air.

Figure 7:
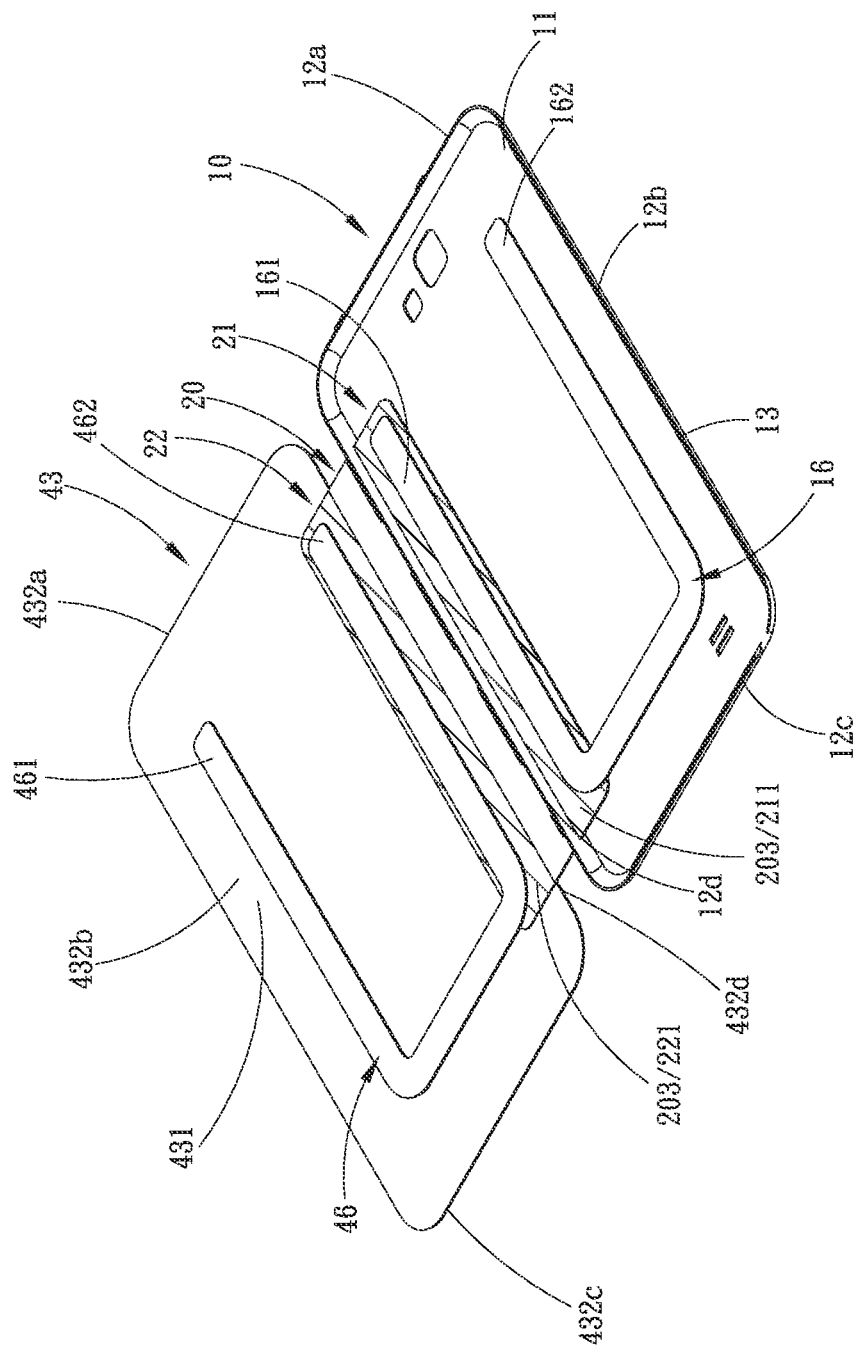
FIG. 7 is a perspective view of the protective device capable of dissipating heat according to a fourth preferred embodiment of the present invention.

Please refer to FIG. 7, which is a perspective view of the protective device according to a fourth preferred embodiment of the present invention. As shown, the fourth preferred embodiment of the protective device is generally structurally similar to the third embodiment except that, in this fourth embodiment, the first extended portion 21 of the flexible heat transfer unit 20 is extended onto the carrier 10 by a length about one-third or one-fourth of the width of the carrier 10, and the carrier 10 is provided on the first inner side 11 with one on-carrier heat transfer element 16, which has a first and a second contact end 161, 162. The first contact end 161 is attached to the first contact surface 211 of the first extended portion 21 to contact with the metal foil 203 of the first contact surface 211, whereas the second contact end 162 is extended away from the first contact end 161. One of the first and the second contact end 161, 162 is in contact with the heat source 32 of the electronic device 30 illustrated in FIG. 4A to transfer the heat produced by the heat source 32 to the other contact end.

In the illustrated fourth preferred embodiment, the second contact end 162 is in contact with the heat source 32 of the electronic device 30 illustrated in FIG. 4A to transfer the heat produced by the heat source 32 to the first contact end 161. Thereafter, the heat is transferred to the first contact surface 211 of the first extended portion 21, and then to the second extended portion 22 on the second inner side 431 of the flip covers 43 via the flexible heat transfer unit 20. The heat is then further transferred to the fourth contact end 462 of the on-cover heat transfer element 46 from the second contact surface 221 of the second extended portion 22, and finally to the third contact end 461, such that the heat can be transferred from the carrier 10 via the flexible heat transfer unit 20 to the flip cover 43 to dissipate into the ambient air.

Figure 8A:
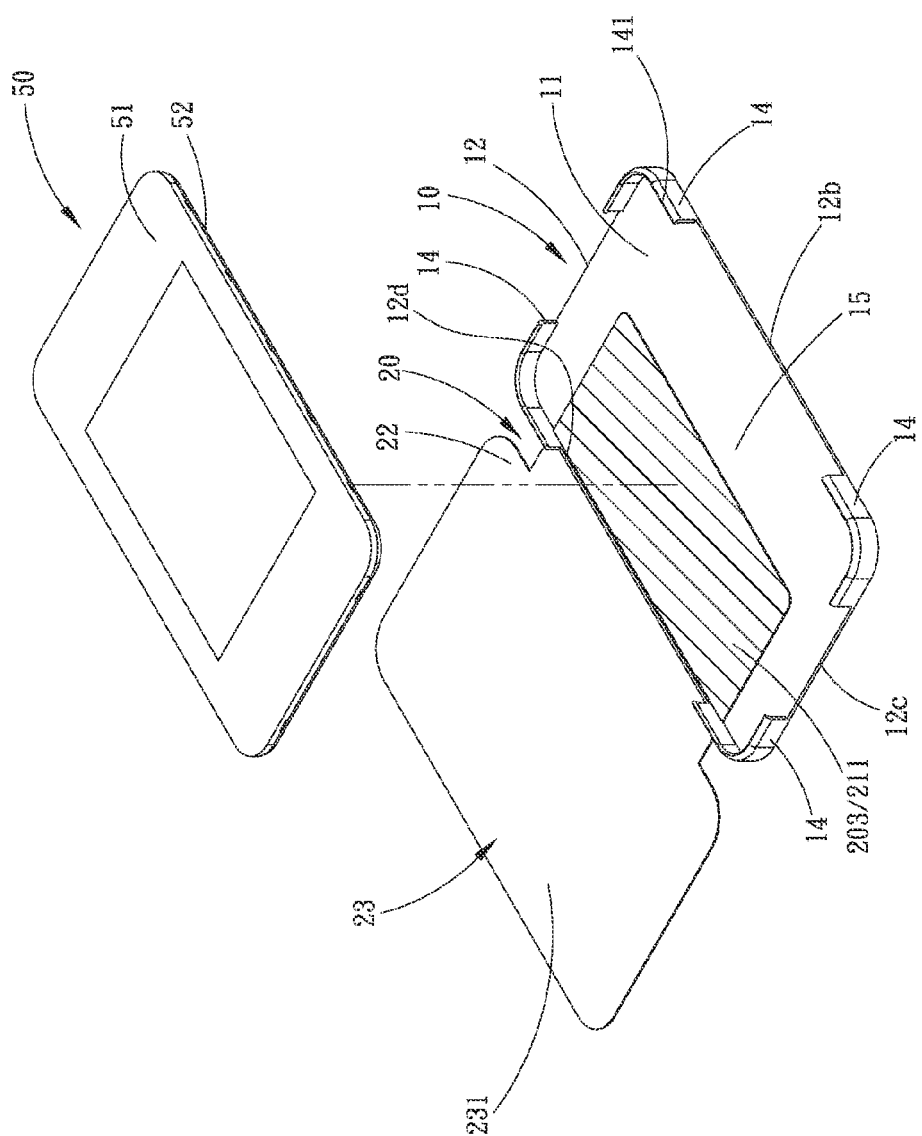
FIG. 8A shows the protective device capable of dissipating heat according to a fifth preferred embodiment of the present invention before an electronic device is received in a carrier thereof.
Figure 8B:
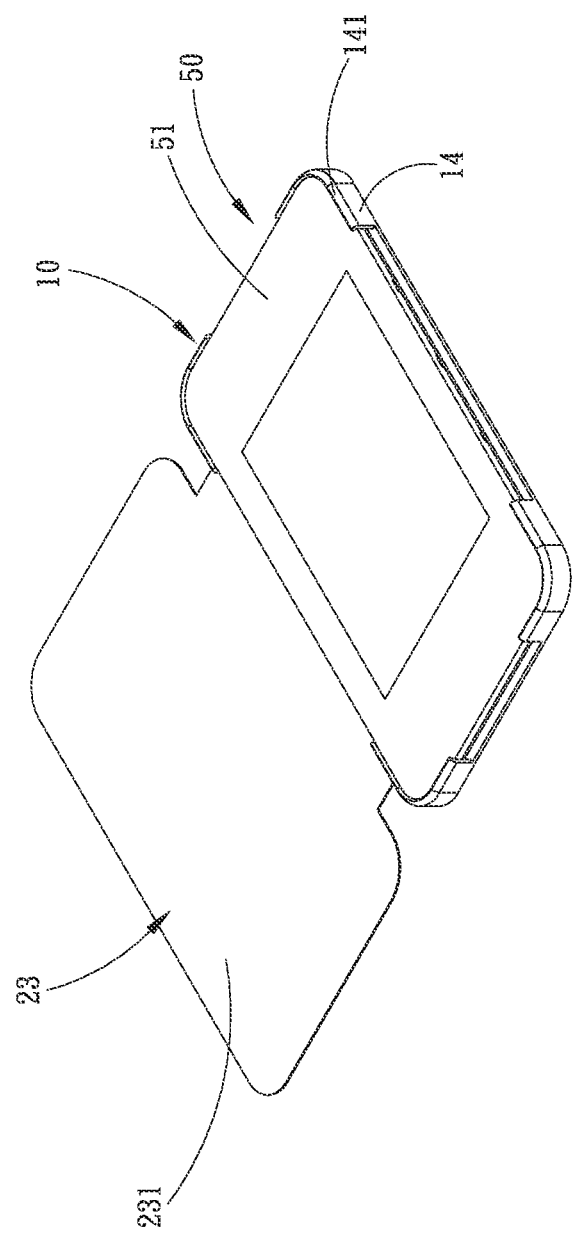
FIG. 8B shows the protective device of FIG. 8A after the electronic device is received in the carrier thereof.

Please refer to FIGS. 8A and 8B, which are perspective views showing the protective device according to a fifth preferred embodiment of the present invention before and after an electronic device 50 is received in the carrier 10 thereof. As shown, the fifth preferred embodiment of the protective device is generally structurally similar to the first preferred embodiment except that, in this fifth preferred embodiment, the first, the second, the third, and the fourth edge 12a, 12b, 12c and 12d of the first inner side 11 of the carrier 10 are respectively upwardly extended to form a protective wall 14, which has a free end inwardly bent to form a retaining edge 141, such that the first inner side 11, the protective walls 14 and the retaining edges 141 together define a receiving space 15 for receiving an electronic device 50 therein, such as a smart phone or a tablet PC.

In the illustrated fifth preferred embodiment, the electronic device 50 includes a front and a back case 51, 52. When the electronic device 50 is received in the receiving space 15 of the carrier 10, the front case 51 is held in place by the retaining edges 141 and the back case 52 is in contact with the first contact surface 211 of the first extended portion 21 of the flexible heat transfer unit 20, such that the heat can be transferred from the back case 52 to the flip cover 23 via the flexible heat transfer unit 20 to dissipate into the ambient air.

In conclusion, with the above arrangements, the heat transferred to the carrier 10 can be further transferred via the flexible heat transfer unit 20 to the flip cover 23 for dissipating into the ambient air. The present invention provides an additional heat dissipation path outside the electronic device 30, 50 to prevent the produced heat from concentrating on the back case of the electronic device 30, 50, so as to effectively eliminate the problem of forming local hot spots on the back case of the electronic device 30, 50.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A protective device capable of dissipating heat for protecting an electronic device, comprising:
   a carrier for correspondingly connecting to or receiving the electronic device therein and having a first inner side oriented to the electronic device and a plurality of edges surrounding the first inner side;
   a flexible connecting element being arranged at one of the edges of the carrier and having two opposite ends that respectively form a first and a second extended portion; the first extended portion being extended onto and partially across an upper surface of the first inner side of the carrier, the first extended portion being connected to the first inner side of the carrier, and the second extended portion being extended away from the carrier to form a flip cover, which can be turned towards or away from the carrier; and the first extended portion being in direct or indirect contact with at least one heat source of the electronic device,
   wherein the first extended portion has a first contact surface facing away from the first inner side of the carrier and oriented to the electronic device and the flexible connecting element is a flexible thin heat PIPE.

2. The protective device claimed in claim 1, wherein the first contact surface of the first extended portion is in contact with the heat source of the electronic device.

3. The protective device as claimed in claim 1, wherein the carrier is provided with an on-carrier heat transfer element, which is in contact with the at least one heat source of the electronic device and has a first contact end and a second contact end; and one of the first and the second contact end being in contact with the first contact surface of the first extended portion.

4. The protective device as claimed in claim 1, wherein the flexible connecting element is selected from the group consisting of a graphite sheet and a metal foil-attached graphite sheet.

5. The protective device as claimed in claim 4, wherein the metal foil-attached graphite sheet includes at least one layer of metal foil attached to at least one layer of graphite sheet.

6. The protective device as claimed in claim 5, wherein the metal foil is made of a material selected from the group consisting of gold, silver, copper, aluminum, and any combination thereof.

7. The protective device as claimed in claim 6, wherein the first contact surface is the metal foil.

8. The protective device as claimed in claim 1, wherein the flip cover is selected from the group consisting of a graphite sheet and a metal foil-attached graphite sheet.

9. The protective device as claimed in claim 1, wherein the flip cover has a second inner side; the second extended portion of the flexible connecting element being extended onto and connected to the second inner side of the flip cover; and the second extended portion having a second contact surface facing away from the second inner side of the flip cover.

10. The protective device as claimed in claim 1, wherein the carrier is a back base of the electronic device and is provided on the edges surrounding the first inner side with a plurality of clamping sections.

11. The protective device as claimed in claim 1, wherein the edges of the first inner side of the carrier are respectively upwardly extended to form a protective wall, which has a free end inwardly bent to form a retaining edge, such that the first inner side, the protective walls and the retaining edges together define a receiving space to receive the electronic device therein.

12. A protective device capable of dissipating heat for protecting an electronic device, comprising:
a carrier for correspondingly connecting to or receiving the electronic device therein and having a first inner side oriented to the electronic device and a plurality of edges surrounding the first inner side;
a flexible connecting element being arranged at one of the edges of the carrier and having two opposite ends that respectively form a first and a second extended portion; the first extended portion being extended onto and partially across an upper surface of the first inner side of the carrier, the first extended portion being connected to the first inner side of the carrier, and the second extended portion being extended away from the carrier to form a flip cover, which can be turned towards or away from the carrier; and the first extended portion being in direct or indirect contact with at least one heat source of the electronic device,
wherein the flip cover has a second inner side; the second extended portion of the flexible connecting element being extended onto and connected to the second inner side of the flip cover; and the second extended portion having a second contact surface facing away from the second inner side of the flip cover,
wherein the flip cover is provided with an on-cover heat transfer element; the on-cover heat transfer element having a third and a fourth contact end, one of which being in contact with the second contact surface of the flexible connecting element.

13. The protective device as claimed in claim 12, wherein the second contact surface of the flexible connecting element is the metal foil.

* * * * *